(12) United States Patent
Kholodkov

(10) Patent No.: US 12,596,871 B2
(45) Date of Patent: Apr. 7, 2026

(54) TEXTUAL ENCODING AND ANALYSIS WITH A LARGE GRAPHICAL LANGUAGE MODEL

(71) Applicant: MICROSOFT TECHNOLOGY LICENSING, LLC, Redmond, WA (US)

(72) Inventor: Dmitry Valentinovich Kholodkov, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 128 days.

(21) Appl. No.: 18/354,067

(22) Filed: Jul. 18, 2023

(65) Prior Publication Data

US 2025/0028902 A1 Jan. 23, 2025

(51) Int. Cl.
G06F 40/253 (2020.01)
G06F 40/30 (2020.01)
G06T 11/20 (2006.01)

(52) U.S. Cl.
CPC ............ G06F 40/253 (2020.01); G06F 40/30 (2020.01); G06T 11/206 (2013.01)

(58) Field of Classification Search
CPC ....... G06F 40/30; G06F 40/253; G06T 11/206
See application file for complete search history.

(56) References Cited

U.S. PATENT DOCUMENTS 8,296,168 B2 10/2012 Subrahmanian et al.
8,467,716 B2 6/2013 Burstein et al.
(Continued)

FOREIGN PATENT DOCUMENTS

CN 116127046 A 5/2023
KR 20230047849 A 4/2023

OTHER PUBLICATIONS

Y. Hou, W. Zhao, Y. Li and J. Wen, "Privacy-Preserved Neural Graph Similarity Learning", Nov. 28, 2022, IEEE Xplore, 2022 IEEE International Conference on Data Mining (ICDM), 191-200 (Year: 2022).*
(Continued)

*Primary Examiner* — Jason Chan
(74) *Attorney, Agent, or Firm* — Newport IP, LLC; Jacob P. Rohwer

(57) ABSTRACT

The techniques discussed herein enhance the operation of content generation and analysis systems. Namely, textual content applications such as technical documentation, creative writing, and content moderation. This is accomplished through generating a graphical representation of a body of text (e.g., a document). The graphical representation can comprise a plurality of nodes representing the words of the document and a plurality of lines that join the nodes representing a level of association between individual words. As such, the graphical representation can capture the semantic and syntactical structure of the associated document while omitting the original textual content. The graphical representation can be subsequently evaluated for complexity based on the density of nodes and lines. Accordingly, the disclosed system can assign a score to a document based on the evaluation of the graphical representation. In addition, various documents can be ranked based on such scores.

19 Claims, 7 Drawing Sheets

(56)  References Cited

U.S. PATENT DOCUMENTS

| | | | |
|---|---|---|---|
| 10,324,969 B2 | 6/2019 | Maitra et al. | |
| 11,334,716 B2 * | 5/2022 | Beller | G06F 40/205 |
| 2009/0254543 A1 * | 10/2009 | Ber | G06F 16/907 |
| | | | 707/999.005 |
| 2011/0267350 A1 * | 11/2011 | Curbera | G06T 11/206 |
| | | | 345/440 |
| 2019/0018843 A1 | 1/2019 | Och et al. | |
| 2021/0004432 A1 | 1/2021 | Li et al. | |
| 2022/0103872 A1 * | 3/2022 | Liu | H04N 21/23418 |

OTHER PUBLICATIONS

Kumar, Ajitesh, "Large language models: Concepts & Examples", Retrieved from: https://vitalflux.com/large-language-models-concepts-examples/, May 1, 2023, 14 Pages.
Schulman, et al., "Introducing ChatGPT", Retrieved from: https://openai.com/blog/chatgpt, Nov. 30, 2022, 11 Pages.
International Search Report and Written Opinion received for PCT Application No. PCT/US2024/036474, mailed on Nov. 29, 2024, 14 pages.
Zhang, et al., "Evolution Analysis of Information Retrieval based on co-word network", 3rd International Conference On Electronic Information Technology And Computer Engineering (EITCE), Oct. 18, 2019, pp. 1837-1840.
International Preliminary Report on Patentability (Chapter I) received for PCT Application No. PCT/US2024/036474, mailed on Jan. 29, 2026, 09 pages.

* cited by examiner

Figure 5:
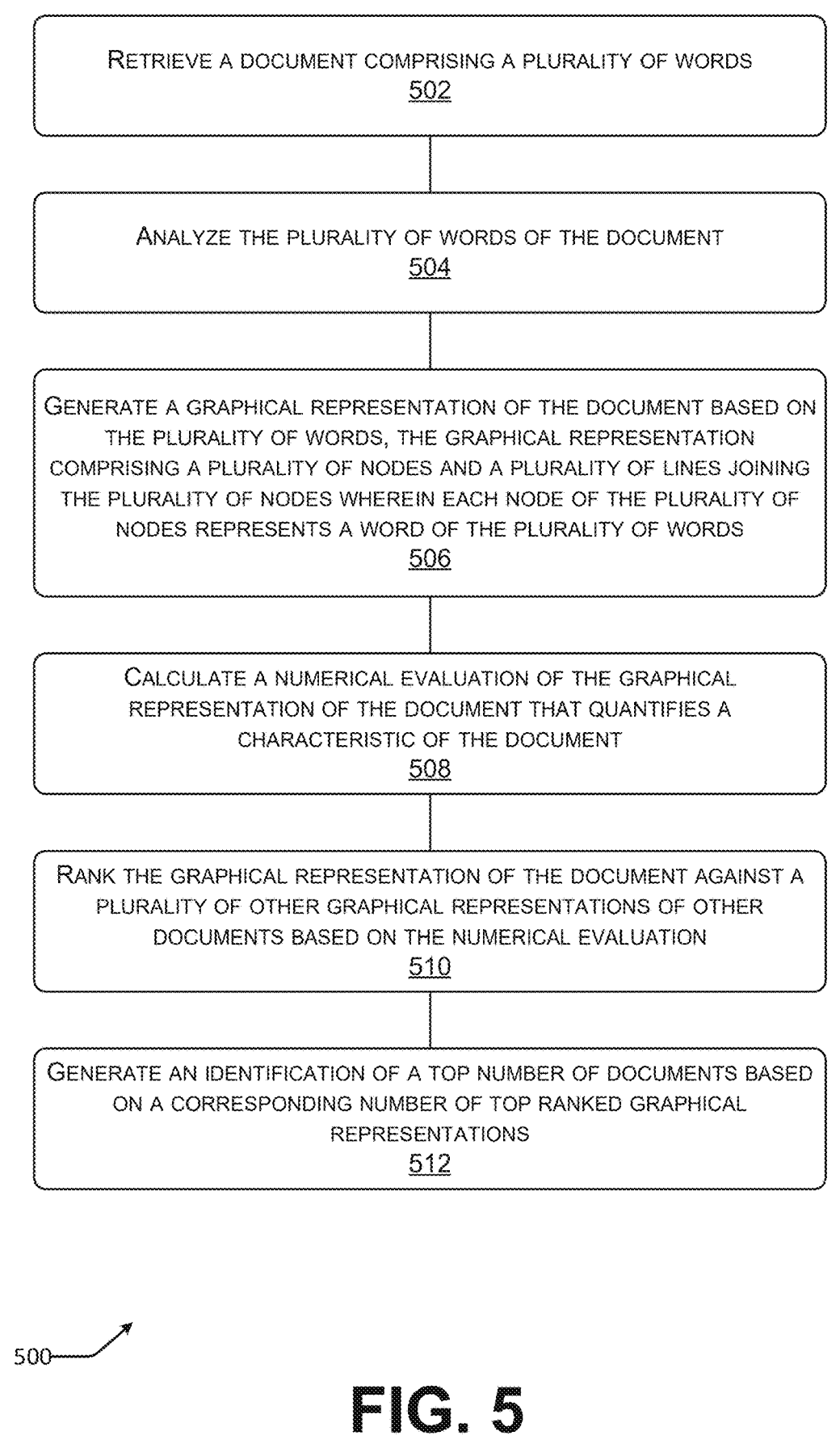

RETRIEVE A DOCUMENT COMPRISING A PLURALITY OF WORDS
502

ANALYZE THE PLURALITY OF WORDS OF THE DOCUMENT
504

GENERATE A GRAPHICAL REPRESENTATION OF THE DOCUMENT BASED ON THE PLURALITY OF WORDS, THE GRAPHICAL REPRESENTATION COMPRISING A PLURALITY OF NODES AND A PLURALITY OF LINES JOINING THE PLURALITY OF NODES WHEREIN EACH NODE OF THE PLURALITY OF NODES REPRESENTS A WORD OF THE PLURALITY OF WORDS
506

CALCULATE A NUMERICAL EVALUATION OF THE GRAPHICAL REPRESENTATION OF THE DOCUMENT THAT QUANTIFIES A CHARACTERISTIC OF THE DOCUMENT
508

RANK THE GRAPHICAL REPRESENTATION OF THE DOCUMENT AGAINST A PLURALITY OF OTHER GRAPHICAL REPRESENTATIONS OF OTHER DOCUMENTS BASED ON THE NUMERICAL EVALUATION
510

GENERATE AN IDENTIFICATION OF A TOP NUMBER OF DOCUMENTS BASED ON A CORRESPONDING NUMBER OF TOP RANKED GRAPHICAL REPRESENTATIONS
512

Figure 7:
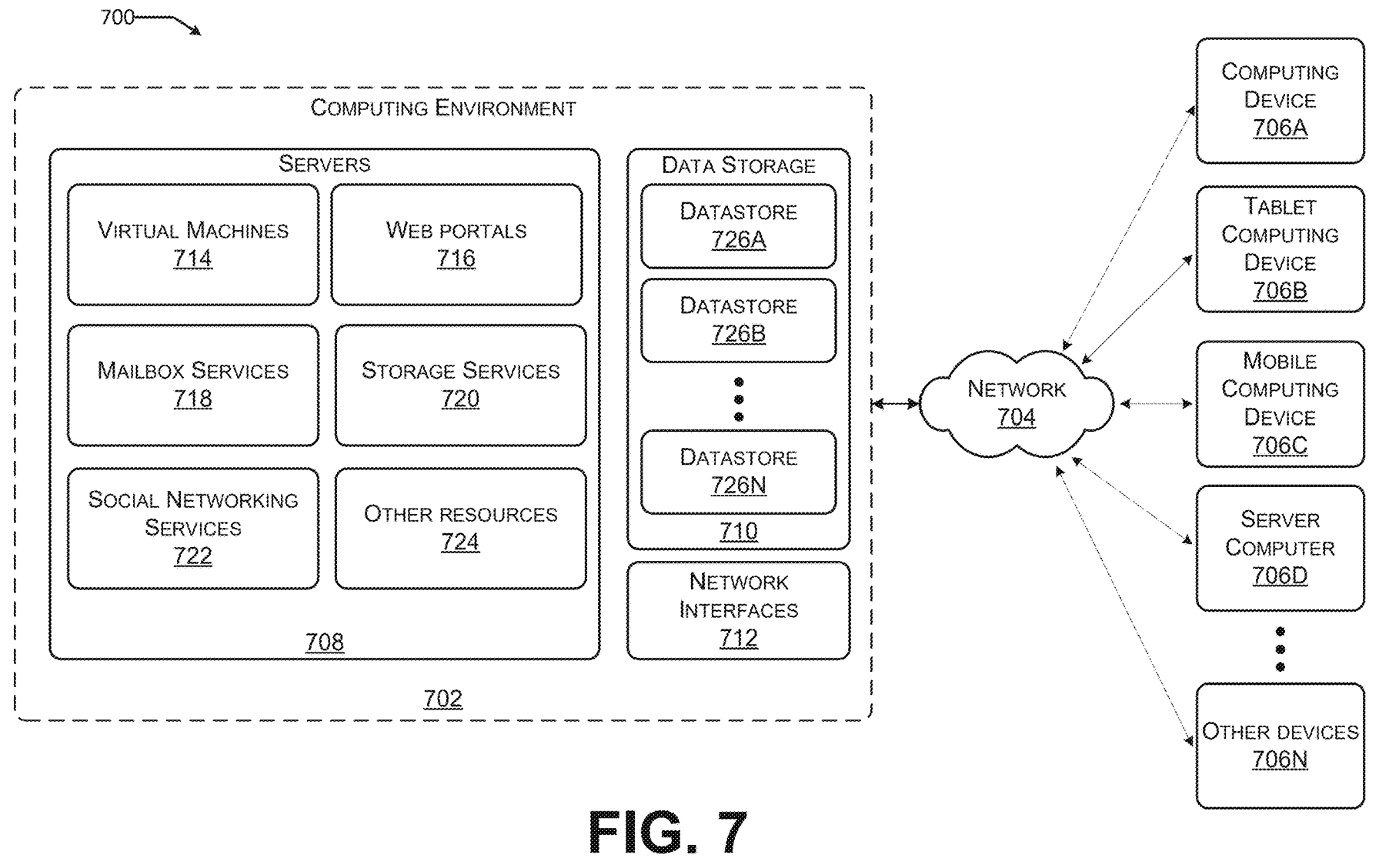

COMPUTING DEVICE 706A

TABLET COMPUTING DEVICE 706B

MOBILE COMPUTING DEVICE 706C

SERVER COMPUTER 706D

OTHER DEVICES 706N

NETWORK 704

COMPUTING ENVIRONMENT

SERVERS

VIRTUAL MACHINES 714

WEB PORTALS 716

MAILBOX SERVICES 718

STORAGE SERVICES 720

SOCIAL NETWORKING SERVICES 722

OTHER RESOURCES 724

708

DATA STORAGE

DATASTORE 726A

DATASTORE 726B

DATASTORE 726N

710

NETWORK INTERFACES 712

TEXTUAL ENCODING AND ANALYSIS WITH A LARGE GRAPHICAL LANGUAGE MODEL

BACKGROUND

In recent years, generative and analytical artificial intelligence (AI) applications have transformed the landscape of content creation and analysis, especially with respect to textual content such as articles, technical documentation, and the like. In many examples, a generative artificial intelligence application can utilize a transformer-based large language model (LLM). Unlike other artificial intelligence models, such as recurrent neural networks and long short-term memory (LSTM) models, transformer-based large language models make use of a native self-attention mechanism to identify vague context from limited available data and even synthesize new content from images and music to software.

However, many existing generative artificial intelligence applications may lack functionality for output quality control and/or evaluation. Consequently, an output that is generated by an artificial intelligence may suffer in quality (e.g., poor word choice, poor phrasing). Unfortunately, many text-based analysis solutions such as natural language processing (NLP) can be computationally intensive and thus time consuming. As such, implementing a quality control system for a generative artificial intelligence application using existing methods may be infeasible.

Moreover, such technical constraints can be worsened by large volumes of content. For instance, an entity may wish to process and organize a large collection of documents which can include thousands or even millions of individual documents. Naturally, applying existing textual processing solutions may be computationally infeasible while manually sorting and organizing such a volume of content may be even more unrealistic. It is with respect to these and other considerations that the disclosure herein is presented.

SUMMARY

The techniques disclosed herein enhance artificial intelligence (AI) applications in generative and analytical contexts. As mentioned above, many existing generative artificial intelligence applications lack functionality for quality control and analysis of generated output. Moreover, many existing solutions for textual analysis can be computationally intensive and thus unfeasible to implement. In addition, this technical challenge can be exacerbated when the volume of content to be analyzed and/or classified is large (e.g., thousands of documents). As such, the disclosed techniques introduce a visual representation for encoding textual content that can streamline analysis and classification processes. While the examples discussed herein relate to textual content it should be understood that the disclosed techniques can be utilized to process any suitable content format (e.g., audio, video).

Generally described, the disclosed system can firstly retrieve a document containing a plurality of words. In various examples, the document can be manually generated (e.g., written by a human) or automatically generated (e.g., produced by a large language model). In addition, the document can be generated for a certain context such as technical writing, creative writing, and so forth. Accordingly, the disclosed system can process the document differently based on the associated context.

Subsequently, the plurality of words of the document can be analyzed by a first multimodal model. The analysis by the first multimodal model can include determining which words are used in the document as well as the quantity of each word. Moreover, the first multimodal model can form connections between individual words based on various factors such as syntax, the placement of words within a sentence, etc., For instance, words and/or phrases that are frequently placed together in a sentence can be considered strongly linked. In various examples, the first multimodal model can be any suitable component for translating textual content into a graphical representation.

Subsequently, the first multimodal model can generate a graphical representation of the document based on the analysis of the plurality of words. In various examples, the graphical representation can comprise a set of nodes that are connected by lines. Accordingly, an individual node of the graphical representation can represent an individual word of the document. In addition, an individual line connecting two nodes can represent a level of association between the two words represented by those two nodes. As such, the line can be rendered with a particular thickness and/or shading to communicate this association. For example, a thicker line can represent a higher level of association in relation to a thinner line. In this way, the document can be encoded in a non-text format that retains the semantic and syntactic meaning of the original text.

The graphical representation of the document can then be further analyzed by a second multimodal model to calculate an evaluation based on the complexity of the graphical representation. In various examples, the evaluation can be a numerical evaluation that quantifies a characteristic of the graphical representation (e.g., the complexity) and thus the associated document. In the present context, complexity of the graphical representation can be understood as the number of nodes and the number of lines included in the graphical representation of the document. Moreover, as will be elaborated on below, the evaluation can consider a simplified graphical representation that pares the graphical representation down to a representation of the emphasis in the document. That is, certain structures within the document that can represent a signature feature of the document such as a rhetorical device, a writing style, or other distinctive aspects. In a specific example, the second multimodal model can be a large language model.

Furthermore, the second multimodal model can compare the evaluation of the graphical representation against other evaluations of previously analyzed documents. Accordingly, the present document can be ranked against other documents based on their respective graphical representations. In various examples, documents can be compared on the basis of subject matter. That is, documents relating to the same topic can be ranked against each other while documents that are not relevant to the topic can be omitted from the ranking. Alternatively, documents can be compared on the basis of their graphical representations irrespective of subject matter.

As such, the disclosed system can generate an indication of a top number of documents based on the ranking of graphical representations. For instance, a user can view graphical representations for the top ten documents out of a collection of documents (e.g., a database) irrespective of subject matter. That is, the ten highest scoring graphical representations can be formatted as a list for viewing by a user. In an alternative example, the user can view the top ten documents for a particular subject matter.

In one example of the technical benefit of the present disclosure, utilizing a graphical representation to encode a text document can improve computing efficiency. As mentioned above, analyzing a body of text using various methods such as natural language processing (NLP) can incur heavy computing resource demands. In contrast, by encoding the text as an image comprising a collection of nodes and lines, the text can be processed more efficiently. This is due in part to the much lower volume of data associated with a small image in relation to a document. In a specific example, the first multimodal model can be configured to generate graphical representations that are 200×200 pixels. The file size for such an image can be roughly two kilobytes. In contrast, a text document can be dozens of kilobytes in size. Moreover, text-based approaches for automatically evaluating the complexity of a body of text can be deeply sophisticated thereby increasing computing resource demand. Conversely, image analysis and classification can be performed more efficiently. As such, the disclosed system can be utilized to enhance the quality of generative artificial intelligence outputs.

In still another example of the technical benefit of the present disclosure, encoding text as a graphical representation can improve the privacy of information systems. This is accomplished by omitting the text itself from the graphical representation. That is, the graphical representation for a given document can contain nodes representing the words of the document and lines connecting the nodes without allowing access to the words themselves. In this way, a document can be encoded and analyzed by various systems without providing said systems with the original content. As such, the disclosed system can avoid exposing sensitive information while retaining the ability to analyze and classify text. In a specific example, the present system can be utilized in a content moderation context for detecting prohibited content in a social media platform (e.g., hate speech, harassment). As such content can contain personal information and other compromising details, it may be necessary to obfuscate such information. By utilizing a graphical representation of the offending text, the system can utilize previously analyzed patterns to determine the presence of prohibited content without access to the text itself.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 5 is a flow diagram showing aspects of a routine for encoding a text document as a graphical representation and assigning a score and ranking to the encoded document.

FIG. 7 is a diagram illustrating a distributed computing environment capable of implementing aspects of the techniques and technologies presented herein.

DETAILED DESCRIPTION

The techniques discussed herein enhance the operation of content generation and analysis systems. Namely, textual content applications such as technical documentation, creative writing, and content moderation. In various examples, this is accomplished through generating a graphical representation of a body of text (e.g., a document). As mentioned above, the graphical representation can include a plurality of nodes representing the words of the document and a plurality of lines that join the nodes representing a level of association between individual words. Accordingly, the graphical representation can be understood as an expression of the complexity of a given body of text (e.g., wordsmithing, sentence structure). In this way, a multimodal model, such as a large language model, can analyze and evaluate a document with enhanced efficiency in relation to text-based approaches such as natural language processing (NLP). While the examples discussed herein, the disclosed techniques can be utilized for any suitable content formats such as audio, video, and the like.

Figure 1:
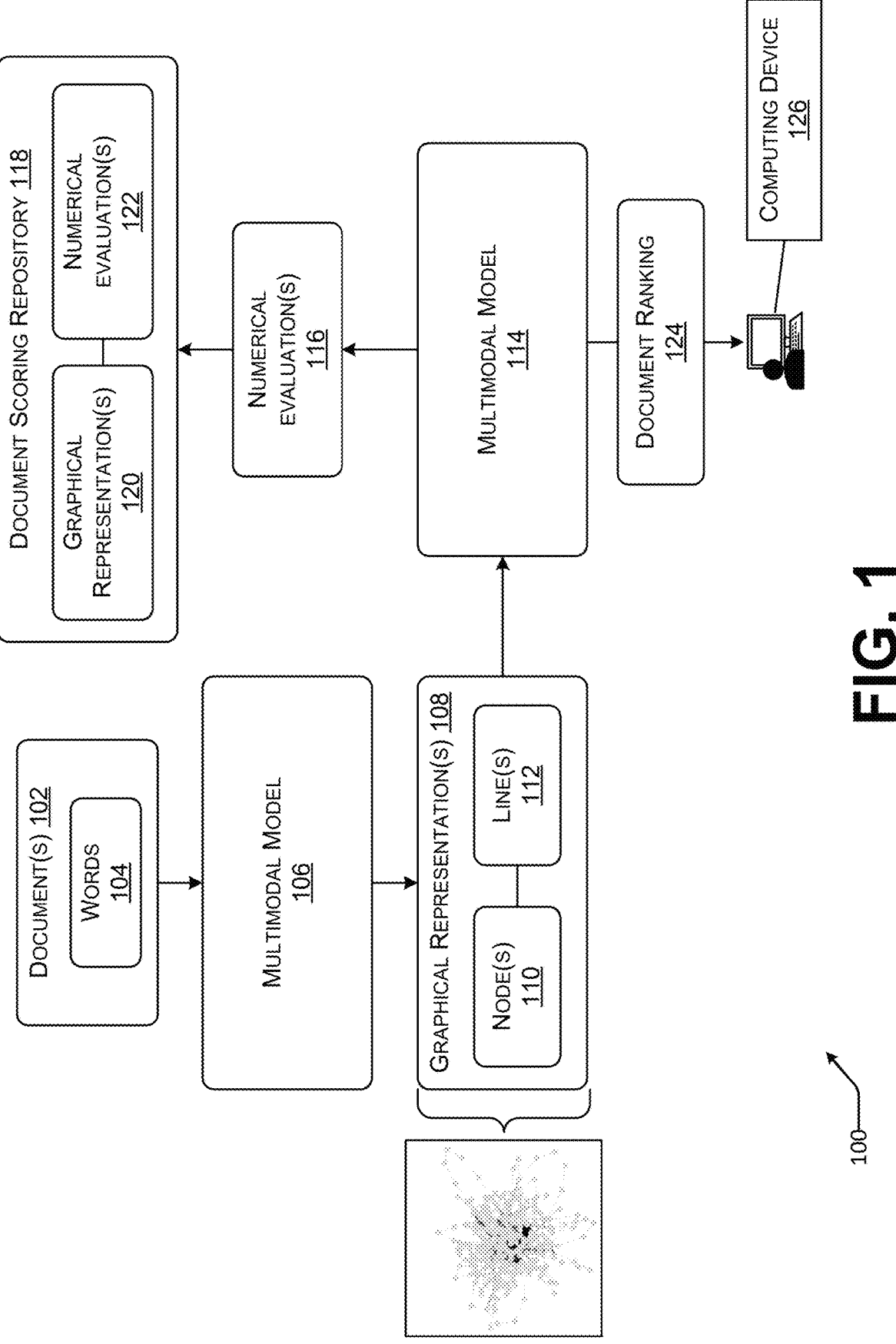
FIG. 1 is a block diagram of a system for generating, evaluating, and ranking a graphical representation of a text document.

FIG. 1 illustrates a system 100 in which a document 102 comprising a plurality of words 104 is processed by a first multimodal model 106 to generate a graphical representation 108 of the document 102. In various examples, the multimodal model 106 can be a large graphical language model or a textual analysis component of such a large graphical language model. In contrast to typical artificial intelligence (AI) approaches, a large graphical language model can be expressly configured to encode textual content (a document 102) as a graphical representation 108. Utilizing a purpose-built component such as a textual analysis component as the multimodal model 106 can enable high efficiency generation of graphical representations 108 in relation to general purpose solutions such as a large language model. However, it should be understood that any suitable component can be utilized to implement the first multimodal model 106.

As mentioned, the graphical representation 108 can comprise a plurality of nodes 110 and a plurality of lines 112 joining the nodes 110. An individual node 110 of the plurality of nodes 110 can represent an individual word 104 of the plurality of words 104. In a specific example, a node 110 can represent a unique word 104 of the document 102. That is, a given word 104 can be represented by a single node 110 despite occurring multiple times throughout the document 102. Alternatively, each node 110 can represent each word 104 of the document 102 irrespective of repetition. Stated another way, a document 102 containing ten thousand words 104 can result in a graphical representation 108 containing ten thousand nodes 110.

In various examples, an individual line 112 of the lines 112 can represent a level of association between two or more words 104 represented by two or more corresponding nodes 110 joined by the line. As will be elaborated upon below, the line 112 can be rendered utilizing various characteristics to visually communicate this level of association. In one example, a thickness of the line 112 can represent the level of association such that a thicker line can represent a greater level of association in relation to a thinner line. In another example, the line 112 can be rendered utilizing various colors and/or shading to communicate the level of association wherein a darker line can represent a greater level of association in relation to a lighter line.

The graphical representation 108 of the document 102 can be subsequently analyzed by a second multimodal model 114 to calculate a numerical evaluation 116. Accordingly, the numerical evaluation 116 can be a score that quantifies a characteristic of the graphical representation 108 in light of an associated criterion. In a specific example, the characteristic can be the complexity of the graphical representation 108 and thus the document 102. As mentioned above, complexity of the graphical representation can be understood as the number of nodes 110 and the number of lines 112 that comprise the graphical representation 108. For example, a graphical representation 108 containing a large number of nodes 110 and a correspondingly large number of lines 112 can receive a greater numerical evaluation 116 in comparison to another graphical representation containing a relatively lower number of nodes and/or lines. Conversely, the characteristic can be simplicity wherein a graphical representation 108 containing a small number of nodes 110 and a correspondingly small number of lines 112 can receive a greater numerical evaluation 116 in comparison to another graphical representation containing a relatively greater number of nodes and/or lines. Moreover, as will be discussed below, the analysis of the graphical representation 108 by the second multimodal model 114 can include generating a simplified form of the graphical representation 108 that extracts distinctive structural features of the document 102 (e.g., points of emphasis, stylistic characteristics).

In various examples, the second multimodal model 114 can be a general-purpose artificial intelligence model such as a large language model. Examples of large language models include GPT-4 by OPENAI, LAMDA by GOOGLE, and LLAMA by META. The second multimodal model 114 can be configured to analyze the graphical representation 108 to calculate the numerical evaluation 116 quantifying a characteristic of the graphical representation 108 (e.g., the complexity) based on the number of nodes 110 and lines 112. Accordingly, the numerical evaluation 116 can be stored in a document scoring repository 118 containing graphical representations 120 and corresponding numerical evaluations 122 for other documents.

In addition, the numerical evaluation 116 can be compared against the other numerical evaluations 122 of the document scoring repository 118 to generate a document ranking 124 providing an indication of a top number of documents based on the graphical representations 108 and 120. Accordingly, the document ranking 124 can be displayed to a user at a computing device 126. For example, the user can query the document scoring repository 118 for information regarding the top ranked documents for a given collection (e.g., an enterprise database, a local file storage). It should be understood that while the document scoring repository 118 can include graphical representations 120 and numerical evaluations 122, the document scoring repository 118 may omit the actual documents associated with the graphical representations 120 and numerical evaluations 122. That is, the document scoring repository 118 may not have access to the original content of various documents. In this way, the system 100 can maintain a record of evaluated documents within the document scoring repository 118 while preventing retention of potentially sensitive information.

Figure 2:
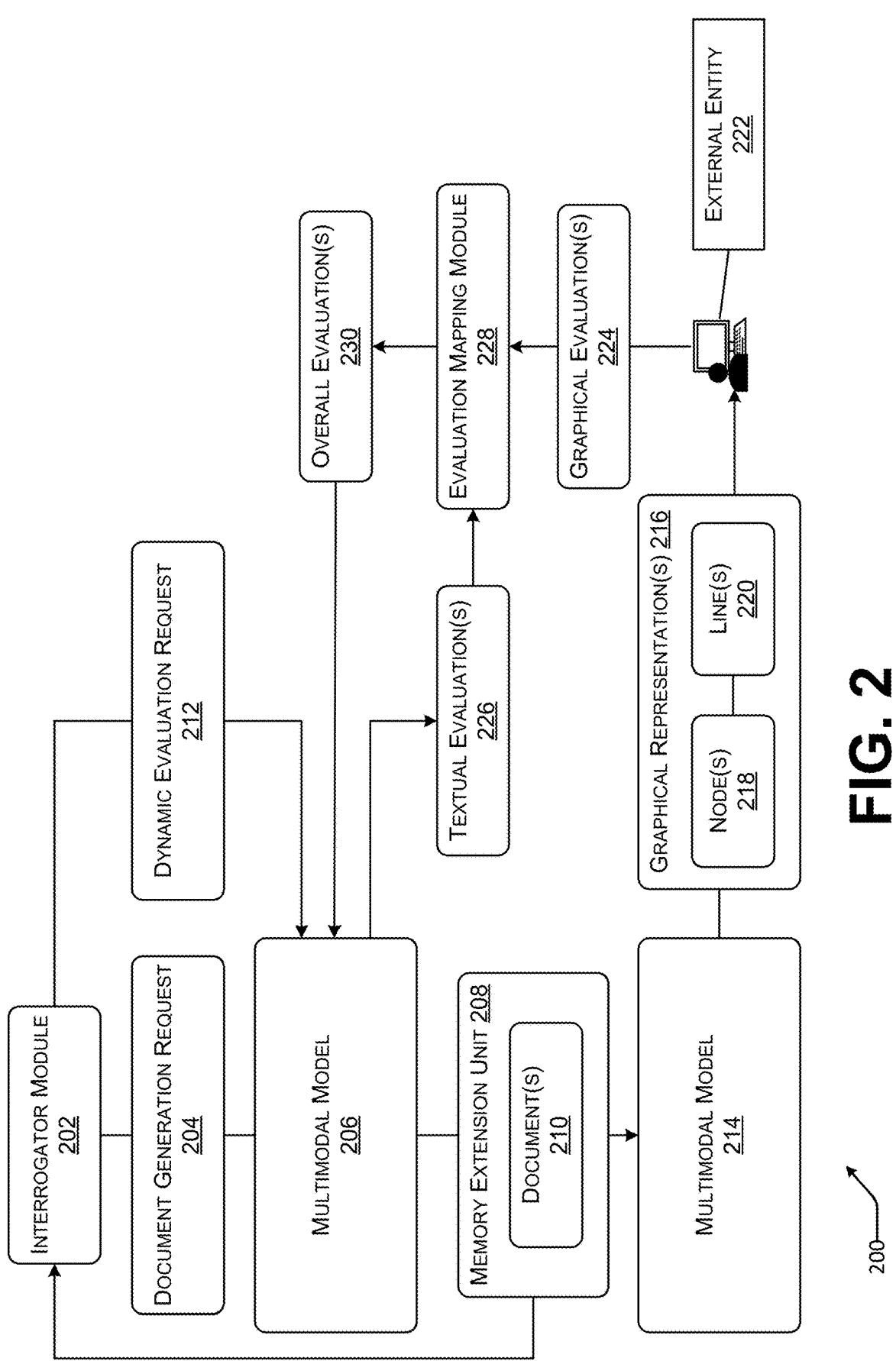
FIG. 2 is a block diagram of a system for training a multimodal model to generate and self-evaluate text content utilizing graphical representations.

Turning now to FIG. 2, aspects of a system 200 in which an interrogator module 202 enables automated content generation and self-evaluation are shown and described. In various examples, the interrogator module 202 can be a component of a software application (e.g., a cloud service) that enables an external entity (e.g., a user) to manipulate and interact with complex programs such as large language models. Accordingly, the interrogator module 202 can produce a document generation request 204. Oftentimes referred to as a prompt, the document generation request 204 can configure a first multimodal model 206 to generate content (e.g., text, audio). In various examples, the document generation request 204 can be formatted as a plain language query (e.g., "please complete the following sequence of words"). The first multimodal model can be a general-purpose model such as a large language model.

The first multimodal model 206 can be configured with a memory extension unit 208 which enables the first multimodal model 206 to retain previously generated information such as a document 210. The document 210 can be generated by the multimodal model in accordance with the document generation request 204 that is generated by the interrogator module 202. In a specific example, the document generation request 204 is a completion request in which the first multimodal model 206 is provided an initial body of text (e.g., a phrase) and tasked with logically completing the body of text. Accordingly, the document 210 can be stored in the memory extension unit 208 to enable subsequent analysis and evaluation.

In various examples, the interrogator module 202 can be configured with access to the memory extension 208 and the document 210 within. As such, the interrogator module 202 can generate a dynamic evaluation request 212 to cause the first multimodal model 206 to evaluate the document 210. For instance, the dynamic evaluation request 212 can include the generated text of the document 210 embedded into the dynamic evaluation request 212. Like the document generation request 204, the dynamic evaluation request 212 can be formatted as a plain language query. In this way, the text of the document 210 can be seamlessly embedded into the dynamic evaluation request 212.

In parallel to the interrogator module 202 generating the dynamic evaluation request 212, a second multimodal model 214 (e.g., the multimodal model 106) can analyze the document 210 to generate a graphical representation 216 of the document 210. As discussed above, the graphical representation 216 can comprise a plurality of nodes 218 and lines 220 joining the nodes 218. Accordingly, an individual one of the nodes 218 can represent an associated word of the document 210 generated by the first multimodal model 206. That is, the graphical representation 216 can encode the semantic structure of the document 210 while omitting the textual content itself. In this way, the graphical representations 216 can be freely analyzed by separate components and/or systems without exposing potentially sensitive information.

Subsequently, the graphical representation 216 can be presented to an external entity 222 (e.g., a user) for evaluation. In various examples, the external entity 222 can generate a graphical evaluation 224 that assigns a numerical score to the graphical representation 216. For instance, the external entity 222 may be instructed to generate manual evaluations that assign a greater score to graphical representations 216 that are more visually complex in relation to other graphical representations. In a specific example, the scores can be assigned between zero and one hundred where one hundred represents a maximal level of complexity of the graphical representation 216.

By utilizing a graphical representation 216, the system 200 can enable compliance with various information and privacy regulations. For example, the first multimodal model 206 and the second multimodal model 214 may be located in a first geographical jurisdiction (e.g., the European Union) in which regulations may prevent the transmission of the document 210 or any constituent content of the document 210 outside of said geographical jurisdiction. However, the external entity may be remotely located in a second geographical jurisdiction (e.g., the United States). As such, plainly transmitting the document 210 may violate the regulations of the first geographical jurisdiction. However, transmitting a graphical representation 216 of the semantic structure of the document 210 that omits the original content of the document 210 can satisfy the requirements of the regulations while enabling analysis and model training outside the first jurisdiction without jeopardizing the privacy or security of the document 210.

While the external entity 222 is generating the graphical evaluation 224, the multimodal model 206 can likewise generate a textual evaluation 226 in accordance with the dynamic evaluation request 212. While the graphical evaluation 224 can be a numerical score quantifying a characteristic of the graphical representation 216 (e.g., the visual complexity), the textual evaluation 226 can be an evaluation of the text of the document 210 itself. That is, the first multimodal model 206 can utilize various natural language processing techniques to evaluate the complexity of the generated document 210. Accordingly, the graphical evaluation 224 can be matched to a corresponding textual evaluation 226 through an evaluation mapping module 228 to generate an overall evaluation 230 of the document 210. In this way, the output of traditional natural language processing scoring methods represented by the textual evaluation 226 can be related to a graphical evaluation 224. With a sufficient number of mappings, the system 200 can form the basis of a large graphical language model that can assign graphical evaluations 224 that accurately capture the textual complexity of a full textual evaluation 226 without access to the original text of the document 210.

In a specific example, the system 200 can form the basis of a large graphical language model that implements content generation and evaluation functionalities. For example, the large graphical language model can be utilized to develop a body of text for publication (e.g., a novel, technical documentation, an informative article). Accordingly, the first multimodal model 206 may generate a large number of candidate documents 210 (e.g., ten thousand). Naturally, only one document 210 can be published. As such, the second multimodal model 214 can generate a graphical representation 216 for each of the candidate documents 210. Utilizing overall evaluations 230 previously acquired from the evaluation mapping module 228, the first multimodal model 206 can be configured to evaluate the graphical representations 216. In this way, the multimodal model 206 can self-evaluate the candidate documents 210 and subsequently rank the documents 210 as discussed above. Based on the ranking of the documents 210, the first multimodal model 206 can select a top-ranked document 210 for publication.

Figure 3:
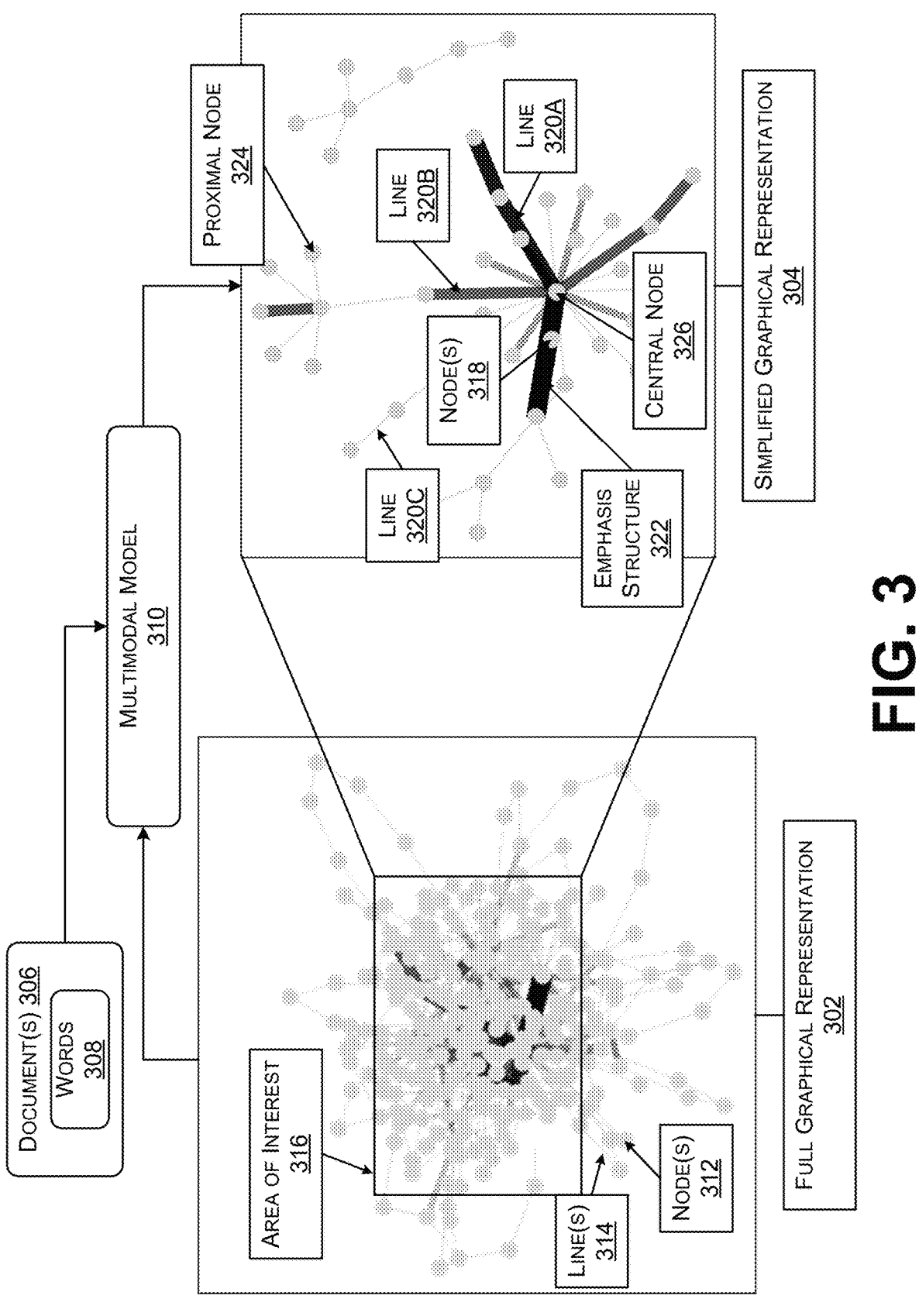
FIG. 3. illustrates a multimodal model generating a simplified graphical representation from a full graphical representation of a document.

Turning now to FIG. 3, an example operation for processing a full graphical representation 302 to generate a simplified graphical representation 304 is shown and described. As discussed above, a document 306 comprising a plurality of words 308 can be analyzed by a multimodal model 310 to generate a full graphical representation 302. In various examples, the multimodal model 310 can be a large graphical language model as discussed above with respect to FIG. 2 and enabled by the system 200. The full graphical representation 302 can include a plurality of nodes 312 representing the words 308 of the document 306. In a specific example, each individual one of the nodes 312 can correspond to an individual one of the words 308. That is, a document 306 containing six hundred words 308 can result in a full graphical representation 302 comprising six hundred nodes 312. In an alternative example, an individual one of the nodes 312 can represent a unique one of the words 308 irrespective of how many times said word occurs in the document 306. For instance, a document 306 containing six hundred words 308 but only three hundred unique words can result in a full graphical representation 302 comprising three hundred nodes 312.

In addition, the full graphical representation 302 can include a plurality of lines 314 joining the nodes 312. As described, an individual one of the lines 314 can represent a level of association between two or more words 308 represented by two or more corresponding nodes 312. As such, an individual one of the lines 314 can be rendered with a calculated thickness and/or color to visually communicate this level of association. Moreover, the multimodal model 310 can be configured with a minimum thickness and default color such that a line rendered in the minimum thickness and default color can represent a minimum level of association. In various examples, a line 314 having a greater thickness and darker color can indicate a greater level of association in relation to another line that is thinner and lighter color. As such, the minimum thickness can be defined as a thin line relative to the dimensions of the full graphical representation 302 (e.g., three pixels for a 200×200 image) while the default color can be defined as a light gray (e.g., #D3D3D3 in a hex color code format).

Furthermore, the multimodal model 310 can identify an area of interest 316 within the full graphical representation 302. In various examples, the area of interest 316 can be identified by detecting a threshold density of nodes 312. For instance, an area at the center of the full graphical representation 302 can contain a density of nodes 312 that satisfies a threshold density that is configured at the multimodal model 310. In addition to the density of nodes 312, the area of interest 316 can be further identified through a threshold level of association. Stated another way, the multimodal model 310 can be configured with a threshold thickness for the lines 314 to identify the area of interest 316 based on a threshold level of association between two or more nodes 312.

Based on the area of interest 316, the multimodal model 310 can generate a simplified graphical representation 304 from the full graphical representation 302. The simplified graphical representation 304 can illustrate various distinctive features of the document 306. That is, the multimodal model 310 can pare down the full graphical representation by removing extraneous nodes 312 from the full graphical representation 302 to extract distinctive features of the document 306. In various examples, a distinctive feature can be defined by a frequency of repetition within the document 306 as represented by a line thickness. For instance, a particular sequence of words 308 that is repeated several times can be rendered as a corresponding sequence of two or more nodes 318 joined by one or more lines 320A. As shown in FIG. 3, the line 320A is rendered with a greater thickness and darker color in relation to another line 320B. Moreover, another line 320C can be rendered with a minimum thickness and default color to represent a minimum level of association as mentioned above.

The various nodes 318 and lines 320A-C of the simplified graphical representation 304 can be selectively included based on a proximity to a distinctive feature thereby forming an emphasis structure 322. As mentioned, the multimodal model 310 can identify a distinctive feature as a sequence of nodes 318 that are joined by a line 320A having a threshold thickness and/or color. Accordingly, the emphasis structure 322 can be defined as nodes 318 having a direct connection to the distinctive feature wherein the direct connection is within a threshold distance to the distinctive feature. For example, a proximal node 324 as illustrated in FIG. 3 can be three steps or "hops" from the distinctive feature defined by the line 320A.

In another example, various nodes 318 can also be included in the emphasis structure 322 based on a proximity to high activity central node 326. A central node 326 can be defined as high activity based on a number of direct connections to the central node 326. Stated another way, a central node 326 can be identified as a high activity node in response to determining that a number of direct connections to the central node 326 exceeds a threshold number of direct connections. For instance, as shown in FIG. 3, the central node 326 includes fifteen direct connections to other nodes 318 thereby indicating that the word represented by the central node 326A is a fundamental aspect of the overall document 306. As such, the emphasis structure 322 can represent a semantic context of the central node 326 and thus a unique stylistic structure of the document 306 (e.g., wordsmithing patterns, rhetorical devices).

In various examples, the simplified graphical representation 304 can be utilized by the multimodal model 310 as a fundamental signature of the document 306. That is, the simplified graphical representation 304 can represent a unique semantic and/or syntactical characteristic of the document 306. Accordingly, the simplified graphical representation 304 can enable the multimodal model 310 to compare and classify the document 306 based on previously analyzed documents and the resultant graphical representations. By utilizing the simplified graphical representation 304, the multimodal model 310 can accelerate classification operations by reducing the volume of data to be processed in relation to a full graphical representation 302 and especially in contrast to the original words 308 of the document 306.

In a specific example, the multimodal model 310 can be utilized in a content moderation context for detecting prohibited content. In this example, the document 306 can be a post on a social media platform or other forum (e.g., an internal data sharing site) where the words 308 are the constituent text of the post. Accordingly, the multimodal model 310 can generate a full graphical representation 302 and derive a simplified graphical representation 304 of the post at hand. Subsequently, the multimodal model 310 can compare the simplified graphical representation 304 against known signatures such as a training dataset and/or previously analyzed and classified content. For example, the multimodal model 310 can be configured with graphical representations indicative of hate speech, harassment, and other prohibited content via a continuous training process. As such, the multimodal model 310 can match the simplified graphical representation 304 to a category of prohibited content and accordingly flag the associated post as containing said prohibited content. Alternatively, the simplified graphical representation 304 may not match any of the categories of prohibited content and subsequently classified as a benign post.

In this way, the multimodal model 310 can efficiently classify textual and/or other content by forgoing typical processing methods such as natural language processing. For instance, the multimodal model 310 may lack access to the original content in some examples wherein the full graphical representation 302 and/or the simplified graphical representation 304 is generated by a separate entity (e.g., a textual image processor). Such restriction of the original content can be desirable in situations where document 306 contains sensitive information such as personal details, disturbing content, and the like. As such, systems enabled by the graphical representations can respect the privacy of various subjects of the document 306 while improving the efficiency of content classification systems.

Figure 4:
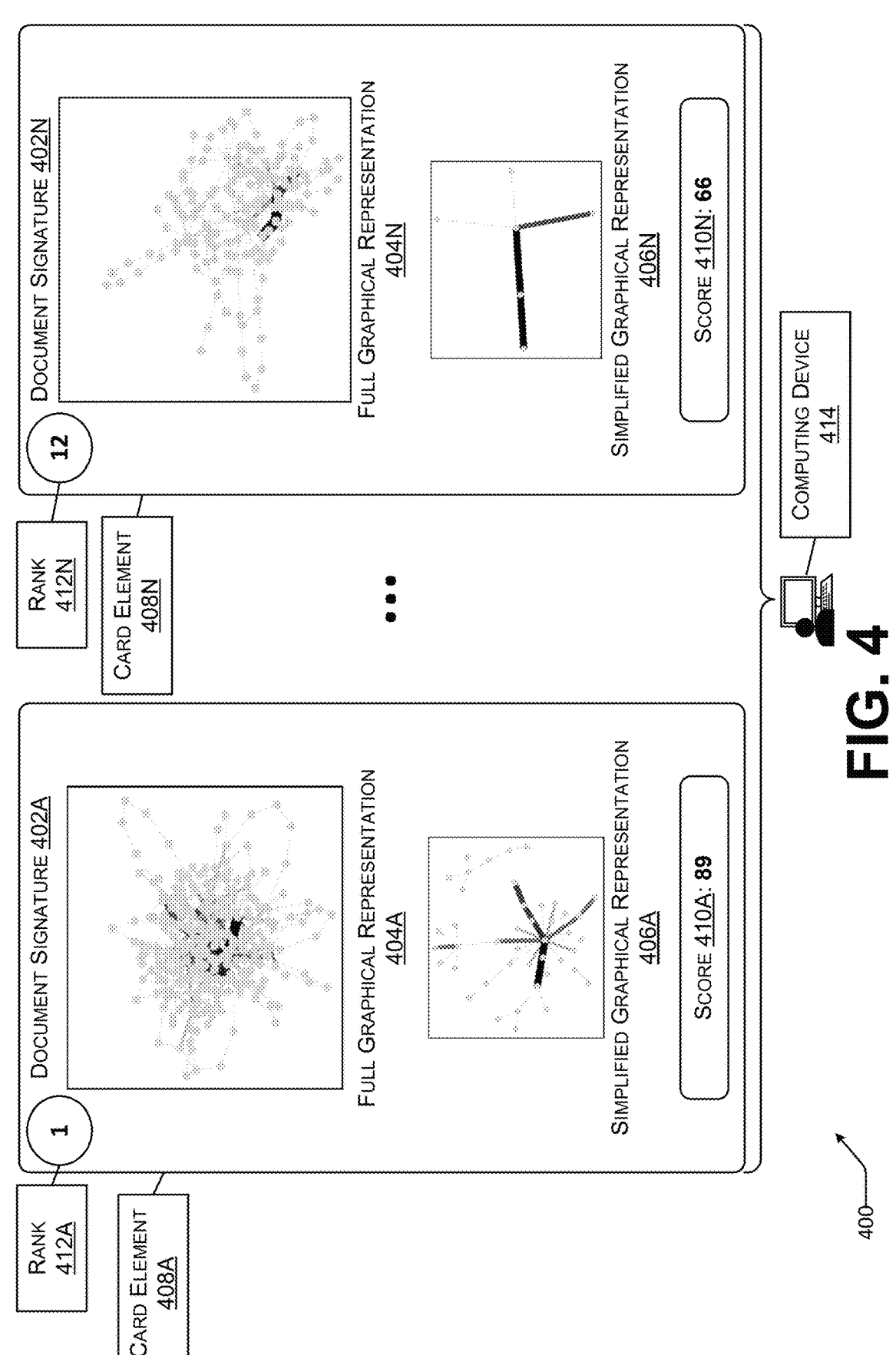
FIG. 4 a user interface displaying an identification of ranked documents using graphical representations of the documents.

Turning now to FIG. 4, aspects of a user interface 400 for viewing and comparing various document signatures 402A-402N are shown and described. As described above, a document can be processed to generate a full graphical representation and a simplified graphical representation that is derived from the full representation. Accordingly, the document signatures 402A-402N can respectively include a full graphical representation 404A-404N and a corresponding simplified graphical representation 406A-406N. As such, the document signatures 402A-402N can serve as full representation of associated documents while omitting the original content of the documents. In this way, the document signatures 402A-402N can be freely viewed, transmitted, and reproduced while eliminating the risk of exposing the original content of the associated document. In various examples, N can denote a number (e.g., ten) where the user interface 400 includes N document signatures 402A-402N.

In various examples, the document signature 402A can be displayed in the user interface 400 as a card element 408A to intuitively associate various elements of the document signature 402A. For instance, the card element 408A can include a score 410A that is displayed in conjunction with the full graphical representation 404A and the simplified graphical representation 406A. As described above, the score 410A can be a numerical value that quantifies a characteristic of the full graphical representation 404A and/or the simplified graphical representation 406A (e.g., complexity). In a specific example, the score 410A can be an average of a first score that is assigned to the full graphical representation 404A and a second score that is assigned to the simplified graphical representation 406A. For instance, the full graphical representation 404A can be assigned a score of "90" while the simplified graphical representation 406A is assigned a score of "88" resulting in an average overall score 410A of "89".

The complexity of the full graphical representation 404A and/or the simplified graphical representation 406A can be defined by the density of nodes in each graphical representation 404A and 406A. For instance, a greater density of nodes can indicate a greater volume of content and/or number of unique words within the associated document. That is, the document can be said to have greater breadth in relation to another set of graphical representations 404N and 406N having a lower density of nodes. In various examples, this complexity can be determined by a multimodal model such as a large language model, a large graphical language model such as those discussed above, or other suitable techniques.

In another example, the complexity can be defined by the density of connections (e.g., lines) within the full graphical representation 404A and/or the simplified graphical representation 406A. For example, a full graphical representation 404A having a large number of thick and/or dark lines can be assigned a greater score than a full graphical representation 404N having a fewer thick and/or dark lines. In addition, the number of thick and/or dark lines can be compared against the number of lines that are rendered in a minimum thickness and/or default color. That is, a greater proportion of thicker and/or darker lines can result in an elevated score 410A. Moreover, the density of connections can be further defined by the number of connections to each node of a graphical representation 404A and/or 406A. For example, a node that is connected to two other nodes by two respective lines can be understood as expressing a lower complexity in relation to a node that is connected to ten other nodes by ten respective lines. As such, the density of lines can represent a level of depth and/or nuance of the associated document wherein a node having many direct connections can represent the usage of a given word across various contexts.

In this way, the scoring methodology of the present system can account for different forms of complexity when evaluating the graphical representations 404A and 406A of a document signature 402A. In a specific example, the score 410A can be an average of a node density score for the full graphical representation 404A, a line density score for the full graphical representation 404A, a node density score for the simplified graphical representation 406A, and a line density score for the simplified graphical representation 406A. That is, the score 410A can incorporate four individual sub-scores to quantify a characteristic of graphical representation 404A and 406A (e.g., the complexity).

Accordingly, the document signatures 402A-402N can be compared against each other to determine a respective rank 412A-412N. In various examples, the ranks 412A-412N can be assigned to the document signatures 402A-402N based on a simple comparison of the associated scores 410A-410N of each document signature 402A-402N for documents having a shared attribute. For example, the document signatures 402A-402N can represent documents that are stored together in the same storage location (e.g., a file sharing database). In another example, the ranks 412A-412N can be restricted to document signatures 402A-402N of documents that share the same subject matter. In this way, the ranks 412A-412N can be customized to provide insight into the structure of various documents across different contexts while eliminating the risk of exposing the original content of said documents.

Subsequently, the card elements 408A-408N that comprise the user interface 400 can be displayed at a computing device 414. In various examples, the computing device 414 can be associated with an owner of the documents represented by the document signatures 402A-402N. For instance, the documents can be stored in an enterprise server that is managed by an organization (e.g., an employer) wherein the computing device 414 is associated with an employee account. As such, the computing device 414 can be subject to access controls in which the various card elements 408A-408N can be omitted from the user interface 400 based on a permissions level of the computing device 414 and/or a user account associated with the computing device.

Proceeding to FIG. 5, aspects of a routine 500 for generating and evaluating a graphical representation of a document are shown and described. With reference to FIG. 5, the routine 500 begins at operation 502 where a system retrieves a document comprising a plurality of words.

Next, at operation 504, the system analyzes the plurality of words of the document.

Then, at operation 506, the system generates a graphical representation of the document based on the plurality of words, the graphical representation comprising a plurality of nodes and a plurality of lines joining the plurality of nodes wherein each node of the plurality of nodes represents a word of the plurality of words.

Subsequently, at operation 508, the system calculates a numerical evaluation of the graphical representation of the document that quantifies a characteristic of the document.

Next, at operation 510, the system ranks the graphical representation of the document against a plurality of other graphical representations of other documents based on the numerical evaluation.

Finally, at operation 512, the system generates an identification of a top number of documents based on a corresponding number of top ranked graphical representations.

For ease of understanding, the process discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the routine 500 may be also implemented in other ways. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 6:
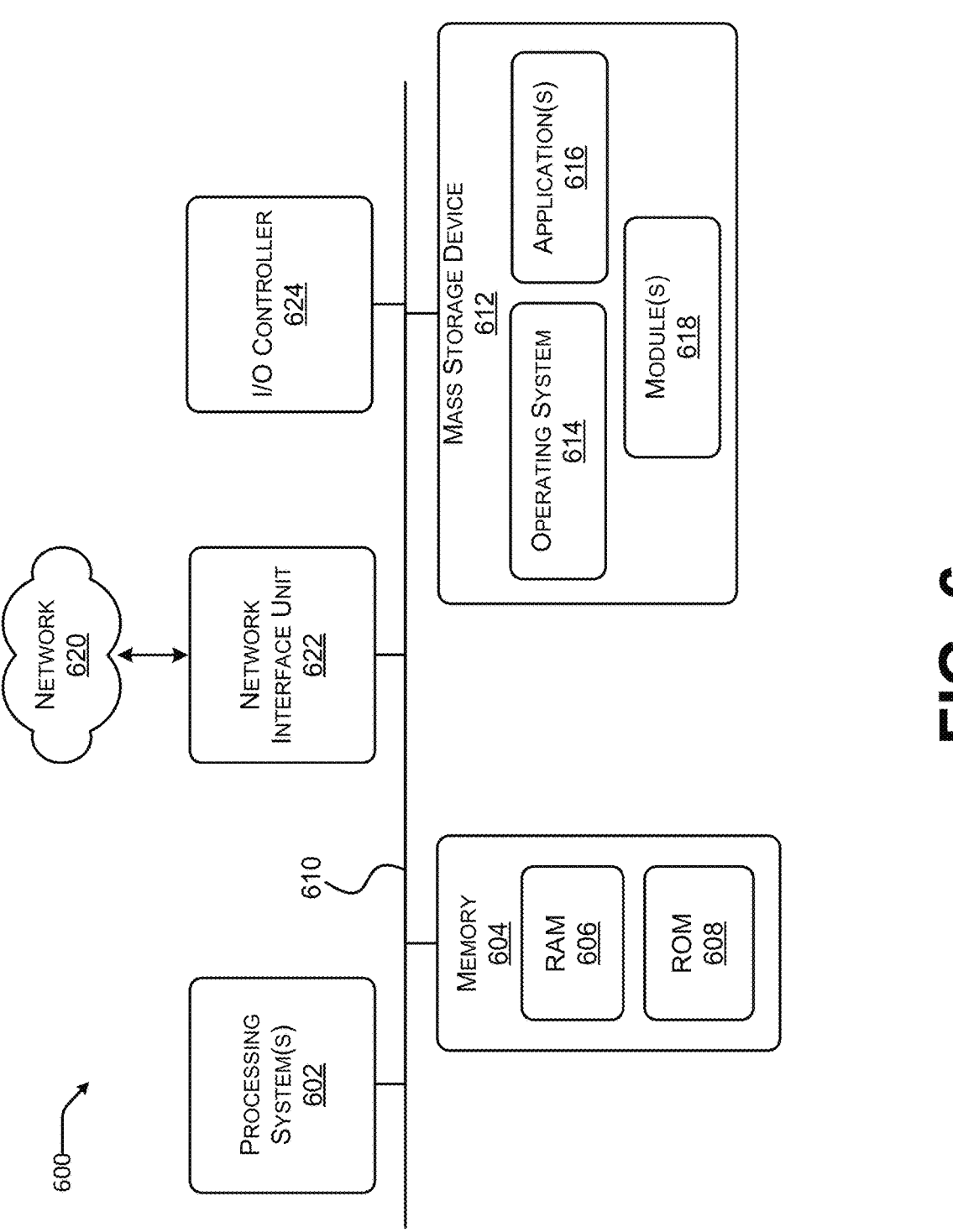
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as a computer or a server configured as part of the cloud-based platform or system 100, capable of executing computer instructions (e.g., a module or a program component described herein). The computer architecture 600 illustrated in FIG. 6 includes processing system 602, a system memory 604, including a random-access memory 606 (RAM) and a read-only memory (ROM) 608, and a system bus 610 that couples the memory 604 to the processing system 602. The processing system 602 comprises processing unit(s). In various examples, the processing unit(s) of the processing system 602 are distributed. Stated another way, one processing unit of the processing system 602 may be located in a first location (e.g., a rack within a datacenter) while another processing unit of the processing system 602 is located in a second location separate from the first location. For example, the processing system 602 can include graphical processing units (GPUs) for executing complex artificial intelligence applications such as large language models. Moreover, the systems discussed herein can be provided as a distributed computing system such as a cloud service.

Processing unit(s), such as processing unit(s) of processing system 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing system 602 through a mass storage controller connected to the bus 610. The mass storage device 612 and its associated computer-readable media provide non-volatile storage for the computer architecture 600. Although the description of computer-readable media contained herein refers to a mass storage device, the computer-readable media can be any available computer-readable storage media or communication media that can be accessed by the computer architecture 600.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

The software components described herein may, when loaded into the processing system 602 and executed, transform the processing system 602 and the overall computer architecture 600 from a general-purpose computing system into a special-purpose computing system customized to facilitate the functionality presented herein. The processing system 602 may be constructed from any number of transistors or other discrete circuit elements, which may individually or collectively assume any number of states. More specifically, the processing system 602 may operate as a finite-state machine, in response to executable instructions contained within the software modules disclosed herein. These computer-executable instructions may transform the processing system 602 by specifying how the processing system 602 transition between states, thereby transforming the transistors or other discrete hardware elements constituting the processing system 602.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "computing devices 706") can communicate with the computing environment 702 via the network 704. In one illustrated configuration, the computing devices 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of computing devices 706 can communicate with the computing environment 702.

In various examples, the computing environment 702 includes servers 708, data storage 610, and one or more network interfaces 712. The servers 708 can host various services, virtual machines, portals, and/or other resources. In the illustrated configuration, the servers 708 host virtual machines 714, Web portals 716, mailbox services 718, storage services 720, and/or social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The disclosure presented herein also encompasses the subject matter set forth in the following clauses.

Example Clause A, a method comprising: retrieving a document comprising a plurality of words; analyzing the plurality of words of the document; generating a graphical representation of the document based on the plurality of words, the graphical representation comprising a plurality of nodes and a plurality of lines joining the plurality of nodes, wherein each node of the plurality of nodes represents a word of the plurality of words; calculating a numerical evaluation of the graphical representation of the document that quantifies a characteristic of the document; ranking the graphical representation of the document against a plurality of other graphical representations of other documents based on the numerical evaluation of the graphical representation and a plurality of other numerical evaluations of the plurality of other graphical representations; and generating an identification of a top number of documents based on a corresponding number of top ranked graphical representations.

Example Clause B, the method of Example Clause A, wherein the document is generated by a multimodal model.

Example Clause C, the method of Example Clause A or Example Clause B, wherein a thickness of a line joining two or more nodes of the graphical representation of the document represents a level of association between two or more words represented by the two or more nodes.

Example Clause D, the method of any one of Example Clause A through C, wherein the numerical evaluation that quantifies the characteristic of the document is calculated based on a complexity of the graphical representation.

Example Clause E, the method of Example Clause D, wherein the complexity of the graphical representation is determined based on a density of nodes included in the graphical representation and a density of lines included in the graphical representation.

Example Clause F, the method of any one of Example Clause A through E, wherein: the plurality of words is omitted from the graphical representation of the document; and the numerical evaluation is calculated without access to the plurality of words of the document.

Example Clause G, the method of any one of Example Clause A through F, further comprising: generating a simplified graphical representation of the document based on the graphical representation; comparing the simplified graphical representation against a plurality of other simplified graphical representations of other documents that are generated based on the plurality of other graphical representations; and determining a writing style for the document based on the plurality of other simplified graphical representations of other documents.

Example Clause H, the method of any one of Example Clause A through G, wherein: the plurality of words of the document is analyzed by a first multimodal model; the graphical representation is generated by the first multimodal model; and the numerical evaluation is calculated by a second multimodal model.

Example Clause I, the method of any one of Example Clause A through H, wherein the characteristic of the document is a complexity of the document.

Example Clause J, a system comprising: one or more processing units; computer-readable storage media storing instructions that, when executed by the one or more processing units, cause the system to perform operations comprising: analyzing the plurality of words of the document; generating a graphical representation of the document based on the plurality of words, the graphical representation comprising a plurality of nodes and a plurality of lines joining the plurality of nodes wherein each node of the plurality of nodes represents a word of the plurality of words; calculating a numerical evaluation of the graphical representation of the document that quantifies a characteristic of the document; ranking the graphical representation of the document against a plurality of other graphical representations of other documents based on the numerical evaluation of the graphical representation and a plurality of other numerical evaluations of the plurality of other graphical representations; and generating an identification of a top number of documents based on a corresponding number of top ranked graphical representations.

Example Clause K, the system of Example Clause J, wherein a thickness of a line joining two or more nodes of the graphical representation of the document represents a level of association between two or more words represented by the two or more nodes.

Example Clause L, the system of Example Clause J or Example Clause K, wherein the numerical evaluation that quantifies the characteristic of the document is calculated based on a complexity of the graphical representation.

Example Clause M, the system of Example Clause L, wherein the complexity of the graphical representation is determined based on a density of nodes included in the graphical representation and a density of lines included in the graphical representation.

Example Clause N, the system of any one of Example Clause J through M, wherein: the plurality of words is omitted from the graphical representation of the document; and the numerical evaluation is calculated without access to the plurality of words of the document.

Example Clause O, the system of any one of Example Clause J through N, wherein the operations further comprise: generating a simplified graphical representation of the document based on the graphical representation; comparing the simplified graphical representation against a plurality of other simplified graphical representations of other documents that are generated based on the plurality of other graphical representations; and determining a writing style for the document based on the plurality of other simplified graphical representations of other documents.

Example Clause P, a computer-readable storage medium having encoded thereon instructions that, when executed by one or more processing units, cause a system to perform operations comprising: analyzing the plurality of words of the document; generating a graphical representation of the document based on the plurality of words, the graphical representation comprising a plurality of nodes and a plurality of lines joining the plurality of nodes wherein each node of the plurality of nodes represents a word of the plurality of words; calculating a numerical evaluation of the graphical representation of the document that quantifies a characteristic of the document; ranking the graphical representation of the document against a plurality of other graphical representations of other documents based on the numerical evaluation of the graphical representation and a plurality of other numerical evaluations of the plurality of other graphical representations; and generating an identification of a top number of documents based on a corresponding number of top ranked graphical representations.

Example Clause Q, the computer-readable storage medium of Example Clause P, wherein a thickness of a line joining two or more nodes of the graphical representation of the document represents a level of association between two or more words represented by the two or more nodes.

Example Clause R, the computer-readable storage medium of Example Clause P or Example Clause Q, wherein the numerical evaluation that quantifies the characteristic of the document is calculated based on a complexity of the graphical representation.

Example Clause S, the computer-readable storage medium of any one of Example Clause P through R, wherein: the plurality of words is omitted from the graphical representation of the document; and the numerical evaluation is calculated without access to the plurality of words of the document.

Example Clause T, the computer-readable storage medium of any one of Example Clause P through S, wherein the operations further comprise: generating a simplified graphical representation of the document based on the graphical representation; comparing the simplified graphical representation against a plurality of other simplified graphical representations of other documents that are generated based on the plurality of other graphical representations; and determining a writing style for the document based on the plurality of other simplified graphical representations of other documents.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different nodes)

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method comprising:

retrieving a document including a plurality of words;

analyzing the plurality of words included in the document;

generating a graphical representation of the document based on the plurality of words, wherein:

the graphical representation of the document includes a plurality of nodes and a plurality of lines joining the plurality of nodes;

each node of the plurality of nodes represents a word of the plurality of words;

a line joining two nodes represents a level of association between two words represented by the two nodes; and the plurality of words is omitted from the graphical representation of the document;

determining a number of the plurality of nodes and a number of the plurality of lines included in the graphical representation of the document;

calculating, by utilizing a model without access to the plurality of words included in the document and based on the number of the plurality of nodes and the number of the plurality of lines included in the graphical representation of the document, a numerical evaluation of the graphical representation of the document that quantifies a characteristic of the document;

ranking the graphical representation of the document against a plurality of other graphical representations of other documents based on the numerical evaluation of the graphical representation of the document and a plurality of other numerical evaluations of the plurality of other graphical representations of the other documents; and generating an identification of a top number of documents based on a corresponding number of top ranked graphical representations.

2. The method of claim 1, wherein the document is generated by a multimodal model.

3. The method of claim 1, wherein:

a thickness of the line joining the two nodes indicates the level of association; and the level of association is determined based on at least one of a syntactic connection or a semantic connection.

4. The method of claim 1, further comprising:

generating a simplified graphical representation of the document based on the graphical representation;

comparing the simplified graphical representation against a plurality of other simplified graphical representations of the other documents that are generated based on the plurality of other graphical representations; and determining a writing style for the document based on the plurality of other simplified graphical representations of the other documents.

5. The method of claim 1, wherein:

the plurality of words of the document is analyzed by a first multimodal model;

the graphical representation is generated by the first multimodal model; and the model that calculates the numerical evaluation is a second multimodal model.

6. The method of claim 1, wherein the characteristic of the document is a complexity of the document.

7. The method of claim 1, wherein the characteristic of the document is a simplicity of the document.

8. A system comprising:

one or more processing units;

computer-readable storage media storing instructions that, when executed by the one or more processing units, cause the system to perform operations comprising:

analyzing a plurality of words included in a document;

generating a graphical representation of the document based on the plurality of words, wherein:

the graphical representation of the document includes a plurality of nodes and a plurality of lines joining the plurality of nodes;

each node of the plurality of nodes represents a word of the plurality of words;

a line joining two nodes represents a level of association between two words represented by the two nodes; and the plurality of words is omitted from the graphical representation of the document;

determining a number of the plurality of nodes and a number of the plurality of lines included in the graphical representation of the document;

calculating, by utilizing a model without access to the plurality of words included in the document and based on the number of the plurality of nodes and the number of the plurality of lines included in the graphical representation of the document, a numerical evaluation of the graphical representation of the document that quantifies a characteristic of the document;

ranking the graphical representation of the document against a plurality of other graphical representations of other documents based on the numerical evaluation of the graphical representation of the document and a plurality of other numerical evaluations of the plurality of other graphical representations of the other documents; and generating an identification of a top number of documents based on a corresponding number of top ranked graphical representations.

9. The system of claim 8, wherein:

a thickness of the line joining the two nodes indicates the level of association; and the level of association is determined based on at least one of a syntactic connection or a semantic connection.

10. The system of claim 8, wherein the operations further comprise:

generating a simplified graphical representation of the document based on the graphical representation;

comparing the simplified graphical representation against a plurality of other simplified graphical representations of the other documents that are generated based on the plurality of other graphical representations; and determining a writing style for the document based on the plurality of other simplified graphical representations of the other documents.

11. The system of claim 8, wherein:

the plurality of words of the document is analyzed by a first multimodal model;

the graphical representation is generated by the first multimodal model; and the model that calculates the numerical evaluation is a second multimodal model.

12. The system of claim 8, wherein the characteristic of the document is a complexity of the document.

13. The system of claim 8, wherein the characteristic of the document is a simplicity of the document.

14. A computer-readable storage medium having encoded thereon instructions that, when executed by one or more processing units, cause a system to perform operations comprising:

analyzing a plurality of words included in a document;

generating a graphical representation of the document based on the plurality of words, wherein:

the graphical representation the document includes a plurality of nodes and a plurality of lines joining the plurality of nodes;

each node of the plurality of nodes represents a word of the plurality of words;

a line joining two nodes represents a level of association between two words represented by the two nodes; and the plurality of words is omitted from the graphical representation of the document;

determining a number of the plurality of nodes and a number of the plurality of lines included in the graphical representation of the document;

calculating, by utilizing a model without access to the plurality of words included in the document and based on the number of the plurality of nodes and the number of the plurality of lines included in the graphical representation of the document, a numerical evaluation of the graphical representation of the document that quantifies a characteristic of the document;

ranking the graphical representation of the document against a plurality of other graphical representations of other documents based on the numerical evaluation of the graphical representation of the document and a plurality of other numerical evaluations of the plurality of other graphical representations of the other documents; and generating an identification of a top number of documents based on a corresponding number of top ranked graphical representations.

15. The computer-readable storage medium of claim 14, wherein:

a thickness of the line joining the two nodes indicates the level of association; and the level of association is determined based on at least one of a syntactic connection or a semantic connection.

16. The computer-readable storage medium of claim 14, wherein the operations further comprise:

generating a simplified graphical representation of the document based on the graphical representation;

comparing the simplified graphical representation against a plurality of other simplified graphical representations of the other documents that are generated based on the plurality of other graphical representations; and determining a writing style for the document based on the plurality of other simplified graphical representations of the other documents.

17. The computer-readable storage medium of claim 14, wherein:

the plurality of words of the document is analyzed by a first multimodal model;

the graphical representation is generated by the first multimodal model; and the model that calculates the numerical evaluation is a second multimodal model.

18. The computer-readable storage medium of claim 14, wherein the characteristic of the document is a complexity of the document.

19. The computer-readable storage medium of claim 14, wherein the characteristic of the document is a simplicity of the document.

\* \* \* \* \*